(12) United States Patent
Wu et al.

(10) Patent No.: US 12,431,819 B2
(45) Date of Patent: Sep. 30, 2025

(54) THREE-PHASE INVERTER AND CONTROL METHOD FOR SAME

(71) Applicant: ALTENERGY POWER SYSTEM INC., Zhejiang (CN)

(72) Inventors: Jian Wu, Zhejiang (CN); Biaojie Qi, Zhejiang (CN); Yongchun Yang, Zhejiang (CN); Yuhao Luo, Zhejiang (CN)

(73) Assignee: ALTENERGY POWER SYSTEM INC., Zhejiang (CN)

(*) Notice: Subject to any disclaimer, the term of this patent is extended or adjusted under 35 U.S.C. 154(b) by 263 days.

(21) Appl. No.: 18/016,353

(22) PCT Filed: Sep. 23, 2020

(86) PCT No.: PCT/CN2020/117032
§ 371 (c)(1),
(2) Date: Jan. 15, 2023

(87) PCT Pub. No.: WO2022/011833
PCT Pub. Date: Jan. 20, 2022

(65) Prior Publication Data
US 2023/0344362 A1    Oct. 26, 2023

(30) Foreign Application Priority Data

Jul. 15, 2020  (CN) .................. 202010681109.1

(51) Int. Cl.
*H02M 7/48* (2007.01)
*H02M 1/00* (2007.01)
*H02M 1/12* (2006.01)
(52) U.S. Cl.
CPC ....... *H02M 7/4815* (2021.05); *H02M 1/0058* (2021.05); *H02M 1/126* (2013.01)

(58) Field of Classification Search
CPC ... H02M 1/0058; H02M 1/126; H02M 7/4815
See application file for complete search history.

(56) References Cited

U.S. PATENT DOCUMENTS 9,484,840 B2    11/2016   Amirahmadi et al.
10,381,921 B1   8/2019    Haryani et al.
(Continued)

FOREIGN PATENT DOCUMENTS

CN    101951186 A    1/2011
CN    102593868 A    7/2012
(Continued)

OTHER PUBLICATIONS

International Search Report for PCT/CN2020/117032 mailed Apr. 21, 2021, ISA/CN.
(Continued)

*Primary Examiner* — Jue Zhang
(74) *Attorney, Agent, or Firm* — Yue (Robert) Xu; Apex Attorneys at Law, LLP

(57) ABSTRACT

A three-phase inverter and a control method therefor are provided. Resonant capacitors are provided between the midpoints of three bridge arms and the positive and negative poles of a DC bus to constitute resonant units with output inductors, so as to establish a resonant network for the implementation of soft switching, without adding a switching transistor. Compared with the soft-switching of the three-phase inverter in the conventional technology, circuit devices are saved, the control process is simplified, and system hardware and software overheads are reduced. By controlling the three-phase inverter to operate in a continuous mode, the switching loss of the switching transistor and the conduction loss of a flyback diode in the switching transistor are reduced, the conversion efficiency is improved,
(Continued)

the electromagnetic noise caused by the switching transistor is reduced, and high-quality grid currents are output.

9 Claims, 10 Drawing Sheets

(56) References Cited

U.S. PATENT DOCUMENTS

| | | |
|---|---|---|
| 2002/0159281 A1 | 10/2002 | Furukawa et al. |
| 2012/0044727 A1 | 2/2012 | Bartsch |
| 2015/0062988 A1* | 3/2015 | Amirahmadi ..... H02M 7/53873 363/97 |
| 2016/0301250 A1 | 10/2016 | Woronowicz et al. |
| 2020/0091837 A1 | 3/2020 | Krumpholz |

FOREIGN PATENT DOCUMENTS

| | | | |
|---|---|---|---|
| CN | 204615690 U | * | 9/2015 |
| CN | 105873790 A | | 8/2016 |
| CN | 205725498 U | | 11/2016 |
| CN | 105553306 B | | 2/2018 |
| CN | 108880305 A | | 11/2018 |
| CN | 110690830 A | | 1/2020 |
| WO | 2010083846 A1 | | 7/2010 |

OTHER PUBLICATIONS

Jiasheng Zhang, Lei Zhang, Wenzhong MA, Power Electronics, Chapter 10: Soft switching technology pp. 239-240, May 31, 2018.
The European search report issued on Jul. 9, 2024 for 20945485.9.

* cited by examiner

THREE-PHASE INVERTER AND CONTROL METHOD FOR SAME

This application is the national phase application of International Patent Application No. PCT/CN2020/117032, titled "THREE-PHASE INVERTER AND CONTROL METHOD FOR SAME", filed on Sep. 23, 2020, which claims the priority to Chinese Patent Application No. 202010681109.1 titled "THREE-PHASE INVERTER AND CONTROL METHOD FOR SAME", filed on Jul. 15, 2020 with the China National Intellectual Property Administration, both of which are incorporated herein by reference in their entireties.

FIELD

The present disclosure relates to the technical field of industrial robots, and in particular, to a three-phase inverter and a method for controlling the three-phase inverter.

BACKGROUND

An inverter is a device that converts direct current into alternating current, and is formed by an inverter bridge, control logic and a filter circuit, such as a grid-connected inverter commonly used for photovoltaic power generation.

In the inverter, soft-switching may reduce the switching loss, improve the conversion efficiency, reduce a stress of a transistor switch, improve reliability of a converter, and reduce EMI noise.

FIG. 1 is a diagram of a first three-phase inverter circuit according to the conventional technology. FIG. 2 is a diagram of a second three-phase inverter circuit according to the conventional technology. FIG. 3 is a diagram of a third three-phase inverter circuit according to the conventional technology.

FIG. 1 shows a most common topology of a three-phase three-arm inverter. For each of three bridge arms, the bridge arm is provided with two switch transistors (such as a switch transistor $Q_1'$, a switch transistor $Q_2'$, a switch transistor $Q_3'$, a switch transistor $Q_4'$, a switch transistor $Q_5'$ and a switch transistor $Q_6'$ as shown in FIG. 1), a terminal of an output inductor (such as, a inductor $L_1'$, a inductor $L_2'$ or a inductor $L_3'$ as shown in FIG. 1) is connected to a midpoint of a corresponding bridge arm, and another terminal of the output inductor is connected to a filter capacitor (such as, $C_1'$, $C_2'$ or $C_3'$ as shown in FIG. 1). The inverter with the topology operates in a continuous mode and cannot directly achieve soft-switching. When the inverter with the topology performs output and filtering, a filtering circuit is formed only when a switch transistor arranged on a corresponding lower bridge arm is switched on, to filter out high-frequency switching harmonic current. In a case that the switch transistor arranged on the lower bridge arm is switched off, the high-frequency switching harmonic current is outputted together with the grid-connected current, and the filtering circuit cannot effectively filter out the high-frequency switching harmonic current. When an output power is low, a proportion of the high-frequency switching harmonic current in a total current is large, resulting in low quality of a waveform of the outputted grid-connected current. In addition, since the inverter with this topology can only operate in the continuous mode, in a case that a starting power is large, the inverter with the topology has high requirements for the output inductor, the filter capacitor and the switch transistor, which is difficult to be implemented. Therefore, the inverter with the common topology operates in the continuous mode.

FIG. 2 and FIG. 3 respectively show topologies of a three-phase converter with soft-switching according to the conventional technology. Based on FIG. 1, the high-frequency switching harmonic current is filtered out by an auxiliary resonant network arranged at a direct-current side ($V_{dc}$) or an alternating-current side. The circuit with the topology is complex, and the auxiliary resonance network is required to be provided with an additional switch transistor to control resonance, which increases hardware and software costs of the whole system.

Providing a solution that how to easily achieve the soft-switching of the three-phase inverter is a technical problem to be solved by those skilled in the art.

SUMMARY

In view of this, a three-phase inverter and a method for controlling the three-phase inverter are provided according to the present disclosure, to easily achieve the soft-switching of the three-phase inverter, and effectively filter out the pollution of the high-frequency switching harmonic current.

In order to solve the above technical problem, a three-phase inverter is provided according to the present disclosure. The three-phase inverter includes three bridge arms, resonant capacitors, output inductors, filter capacitors, and a controller;

where for each of the three bridge arms,
said bridge arm is provided with two switch transistors, the controller is connected to a control terminal of each of the two switch transistors; a first terminal of a switch transistor of the two switch transistors of said bridge arm is connected to a positive pole of a direct-current bus, a second terminal of the other switch transistor of the two switch transistors of said bridge arm is connected to a negative pole of the direct-current bus, a second terminal of the switch transistor of the two switch transistors of said bridge arm is connected to a first terminal of the other switch transistor of the two switch transistors of said bridge arm, and a connection point of the two switch transistors serves as a midpoint of said bridge arm; and
said bridge arm corresponds to two resonant capacitors, one output inductor and one filter capacitor, a first terminal of a resonant capacitor of the two resonant capacitors is connected to the positive pole of the direct-current bus, a second terminal of the other resonant capacitor of the two resonant capacitors is connected to the negative pole of the direct-current bus, a second terminal of the resonant capacitor of the two resonant capacitors is connected to a first terminal of the other resonant capacitor of the two resonant capacitors, the midpoint of said bridge arm and a first terminal of the output inductor, and a second terminal of the output inductor is connected to a first terminal of the filter capacitor.
where second terminals of all the filter capacitors are connected to each other.

In an embodiment, the second terminals of all the filter capacitors are grounded.

In an embodiment, the controller is a digital signal processor or a field programmable gate array.

In order to solve the above technical problem, a method for controlling a three-phase inverter is further provided according to the present disclosure. Based on any one of the controllers described above, the method includes:

after a grid-connected current is generated in a current phase, controlling a main switch transistor of a bridge arm corresponding to the current phase to be switched on in a case that it is detected a soft-switching condition is met in the current phase;

controlling the main switch transistor to be switched off, in a case that a peak current passing through an output inductor of the bridge arm corresponding to the current phase reached a predetermined reference current, or a duration for which the main switch transistor is switched on reached a predetermined duration;

controlling a synchronous switch transistor to be switched on to perform synchronous rectification in a case that a body diode of the synchronous switch transistor is switched on, and controlling the synchronous switch transistor to be switched off in a case that a current passing through the output inductor of the bridge arm corresponding to the current phase decreases to zero;

during a dead time period of the current phase, when a resonant capacitor, the output inductor and a filter capacitor of the bridge arm corresponding to the current phase naturally resonate with each other, returning to a step of the controlling the main switch transistor of the bridge arm corresponding to the current phase to be switched on in a case that it is detected the soft-switching condition is met;

where the main switch transistor is a switch transistor that is firstly switched on of the bridge arm corresponding to the current phase, and the synchronous switch transistor is the other switch transistor of the bridge arm corresponding to the current phase.

In an embodiment, controlling the switch transistor of the bridge arm corresponding to the current phase to be switched on or off includes:

controlling a waveform of a fundamental component of the output inductor of the bridge arm corresponding to the current phase to be a power frequency sine wave, so that a waveform of output current of the current phase is a sine wave.

In an embodiment, controlling a waveform of a fundamental component of the output inductor of the bridge arm corresponding to the current phase to be a power frequency sine wave, so that a waveform of an output current of the current phase is a sine wave includes:

controlling a waveform of an average equivalent current during each switching cycle to be a sine wave, so that the waveform of the output current of the current phase is the sine wave, where where the switching cycle is a cycle of a grid-connected current generated by the current phase.

In an embodiment, controlling a waveform of a fundamental component of the output inductor of the bridge arm corresponding to the current phase to be a power frequency sine wave, so that a waveform of an output current of the current phase is a sine wave includes:

performing frequency conversion control on the switch transistor, so that the waveform of output current of the current phase is the sine wave.

In an embodiment, the predetermined reference current meets the following equation:

$$\frac{I_{ref}(T_{on} + T_{off})}{2T} = I_{out}\sin(\omega t + \theta),$$

where, $I_{ref}$ represents the predetermined reference current, $T_{on}$ represents the duration for which the main switch transistor is switched on, $T_{off}$ represents a duration for which the synchronous switch transistor is switched on, T represents a switching cycle, $I_{out}\sin(\omega t+\theta)$ represents an average equivalent current passing through the output inductor of the bridge arm corresponding to the current phase during the switching cycle, $\omega$ represents a power frequency of a power grid, and $\theta$ represents a phase difference between the predetermined reference current and a voltage of the power grid.

In an embodiment, controlling the switch transistor of the bridge arm corresponding to the current phase to be switched on or off includes:

adjusting a power factor by controlling the phase difference.

In an embodiment, the adjusting a power factor by controlling the phase difference includes:

when a full active power output control is performed, controlling the phase difference to be zero; and when an incomplete active power output control is performed, controlling the phase difference to be non-zero, and adjusting a reactive power by controlling the phase difference.

The three-phase inverter according to the present disclosure includes three bridge arms, resonant capacitors, output inductors, filter capacitors, and a controller. For each of the three bridge arms, the bridge arm is provided with two switch transistors, one terminal of one switch transistor of the two switch transistors is connected to a positive pole of the direct-current bus, and one terminal of the other switch transistor of the two switch transistors is connected to a negative pole of the direct-current bus, the other terminals of the two switch transistors are connected to each other and a connection point of the two switch transistors serves as a midpoint of the bridge arm, the midpoint of the bridge arm is connected to two resonant capacitors and an output inductor, the other terminals of the resonant capacitors are respectively connected to the positive pole of the direct-current bus and the negative pole of the direct-current bus, the other terminal of the output inductor is connected to the filter capacitor, and the other terminal of the filter capacitor is grounded. A resonant unit is formed by including the output inductor and the resonant capacitors without an additional switch transistor, thus a resonant network is established to achieve the soft-switching. Compared with the soft-switching of the three-phase inverter in the conventional technology, in the three-phase inverter according to the present disclosure, components of the circuit can be saved, and the control process can be simplified, thereby reducing the hardware and software costs of the system.

The method for controlling a three-phase inverter is further provided according to the present disclosure. The three-phase inverter is controlled to operate in a discontinuous mode, so that a zero-voltage-switching state of the switch transistor can be realized by using the resonance, and synchronous rectification is realized simultaneously, which reduces the switching loss of the switch transistor and the conduction loss of the flyback diode in the switch transistor, thereby improving the conversion efficiency and reducing the electromagnetic noise brought by the switch transistor.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

A three-phase inverter and a method for controlling the three-phase inverter are provided according to the present disclosure, to easily achieve the soft-switching of the three-phase inverter, and effectively filter out the pollution of the high-frequency switching harmonic current.

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 4:
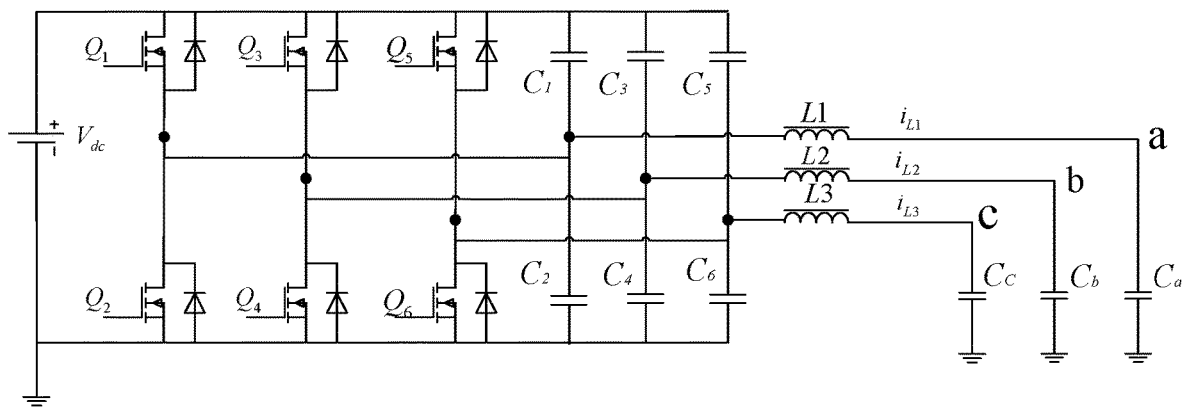
FIG. 4 is a diagram of a three-phase inverter circuit according to an embodiment of the present disclosure.

FIG. 4 is a diagram of a three-phase inverter circuit according to an embodiment of the present disclosure.

The three-phase inverter according to the embodiment of the present disclosure includes three bridge arms, resonant capacitors, output inductors, filter capacitors, and a controller.

For each of the three bridge arms, the bridge arm is provided with two switch transistors, the controller is connected to a control terminal of each of the two switch transistors, a first terminal of a switch transistor in the bridge arm is connected to a positive pole of a direct-current bus, a second terminal of the other switch transistor of the bridge arm is connected to a negative pole of the direct-current bus, a second terminal of the switch transistor of the bridge arm is connected to a first terminal of the other switch transistor in the bridge arm, and a connection point of the two switch transistors serves as a midpoint of the bridge arm.

For each of the three bridge arms, the bridge arm corresponds to two resonant capacitors, one output inductor and one filter capacitor, a first terminal of a resonant capacitor is connected to the positive pole of the direct-current bus, a second terminal of the other resonant capacitor is connected to the negative pole of the direct-current bus, a second terminal of the resonant capacitor is connected to a first terminal of the other resonant capacitor, the midpoint of the bridge arm and a first terminal of the output inductor, and a second terminal of the output inductor is connected to a first terminal of the filter capacitor.

Second terminals of all the filter capacitors are connected to each other.

An a-phase bridge arm of the three-phase inverter corresponds to a switch transistor $Q_1$, a switch transistor $Q_2$, a resonant capacitor $C_1$, a resonant capacitor $C_2$, an output inductor $L_1$, and a filter capacitor $C_a$. A b-phase bridge arm of the three-phase inverter corresponds to a switch transistor $Q_3$, a switch transistor $Q_4$, a resonant capacitor $C_3$, a resonant capacitor $C_4$, an output inductor $L_2$, and a filter capacitor $C_b$. A c-phase bridge arm of the three-phase inverter corresponds to a switch transistor $Q_5$, a switch transistor $Q_6$, a resonant capacitor $C_5$, a resonant capacitor $C_6$, an output inductor $L_3$, and a filter capacitor $C_c$.

As shown in FIG. 4, a first terminal of the switch transistor $Q_1$, a first terminal of the switch transistor $Q_3$ and a first terminal of the switch transistor $Q_5$ are connected to the positive pole of the direct-current bus $V_{dc}$. A second terminal of the switch transistor $Q_2$, a second terminal of the switch transistor $Q_4$ and a second terminal of the switch transistor $Q_6$ are connected to the negative pole of the direct-current bus. A second terminal of the switch transistor $Q_1$ is connected to a first terminal of the switch transistor $Q_2$, and a connection point of the switch transistor Q and the switch transistor $Q_2$ serves as a midpoint of the a-phase bridge arm. A second terminal of the switch transistor $Q_3$ is connected to a first terminal of the switch transistor $Q_4$, and a connection point of the switch transistor $Q_3$ and the switch transistor $Q_4$ serves as a midpoint of the b-phase bridge arm. A second terminal of the switch transistor $Q_5$ is connected to a first terminal of the switch transistor $Q_6$, and a connection point of the switch transistor $Q_5$ and the switch transistor $Q_6$ serves as a midpoint of the c-phase bridge arm. A first terminal of the output inductor $L_1$, a second terminal of the resonant capacitor $C_1$ and a first terminal of the resonant capacitor $C_2$ are connected to the midpoint of the a-phase bridge arm. A first terminal of the output inductor $L_2$, a second terminal of the resonant capacitor $C_3$ and a first terminal of the resonant capacitor $C_4$ are connected to the midpoint of the b-phase bridge arm. A first terminal of the output inductor $L_3$, a second terminal of the resonant capacitor $C_5$ and a first terminal of the resonant capacitor $C_6$ are connected to the midpoint of the c-phase bridge arm. A second terminal of the output inductor $L_1$ is connected to a first terminal of the filter capacitor $C_a$. A second terminal of the output inductor $L_2$ is connected to a first terminal of the filter capacitor $C_b$. A second terminal of the output inductor $L_3$ is connected to a first terminal of the filter capacitor $C_c$. A second terminal of the filter capacitor $C_a$, a second terminal of the filter capacitor $C_b$ and a second terminal of the filter capacitor $C_c$ are grounded.

A continuous mode and a discontinuous mode may be determined according to whether a current passing through an output inductor is zero during high-frequency switching (on and off) of a switch transistor. That is, when a switch transistor of a current bridge arm is switched on, if a current passing through an output inductor in a previous bridge arm is reduced to zero, the inverter operates in the discontinuous mode; otherwise, the inverter operates in the discontinuous mode.

According to the conventional technology, the three-phase converter archives the soft-switching by an auxiliary resonant network arranged in a main circuit. Whether the auxiliary resonant network is arranged at a direct-current side or an alternating-current side, a circuit of the auxiliary resonant network is complex, and is normally provided with switch transistors. In order to achieve resonance, operation states increase, resulting in the increase of control difficulty. Further, the switch transistors require an additional auxiliary power supply and a drive circuit, increasing the cost of the whole system. In the embodiment of the present disclosure, a resonant network is established by using the output inductors as resonant inductors without the additional auxiliary resonant network, so as to achieve soft-switching. Thus, the output inductors can naturally resonate with the resonant capacitors, creating conditions for switching on the switch transistor at zero voltage, so as to reduce the switching loss, improve the conversion efficiency, reduce EMI noise and reduce a stress of the switch transistor, thereby improving the reliability of the system. Since a larger output inductor is not required, a multi-machine parallel system (that is, output terminals of multiple three-phase inverters are connected to one interface of the power grid) may stably operate.

In an embodiment, the controller may be a digital signal processor (DSP) or a field programmable gate array (FPGA) or other controllers with similar functions. The switch transistor may be a MOS transistor, an IGBT or a thyristor.

Figure 1:
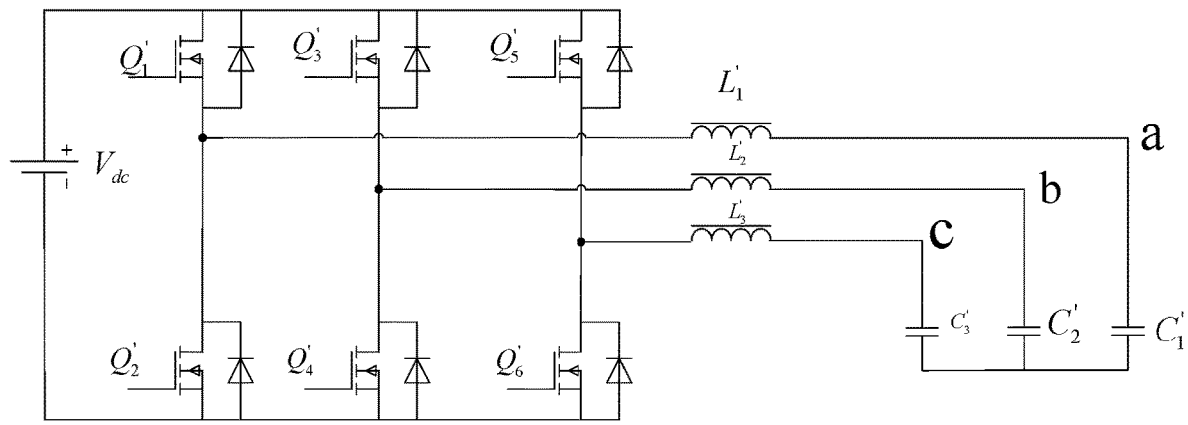
FIG. 1 is a diagram of a first three-phase inverter circuit according to the conventional technology.
Figure 2:
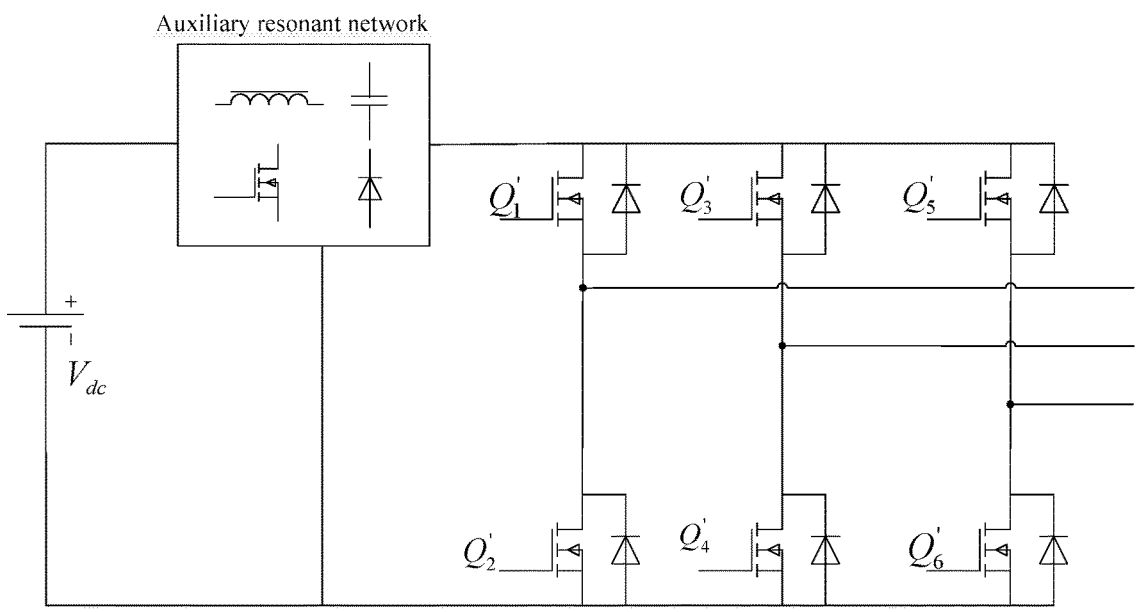
FIG. 2 is a diagram of a second three-phase inverter circuit according to the conventional technology.
Figure 3:
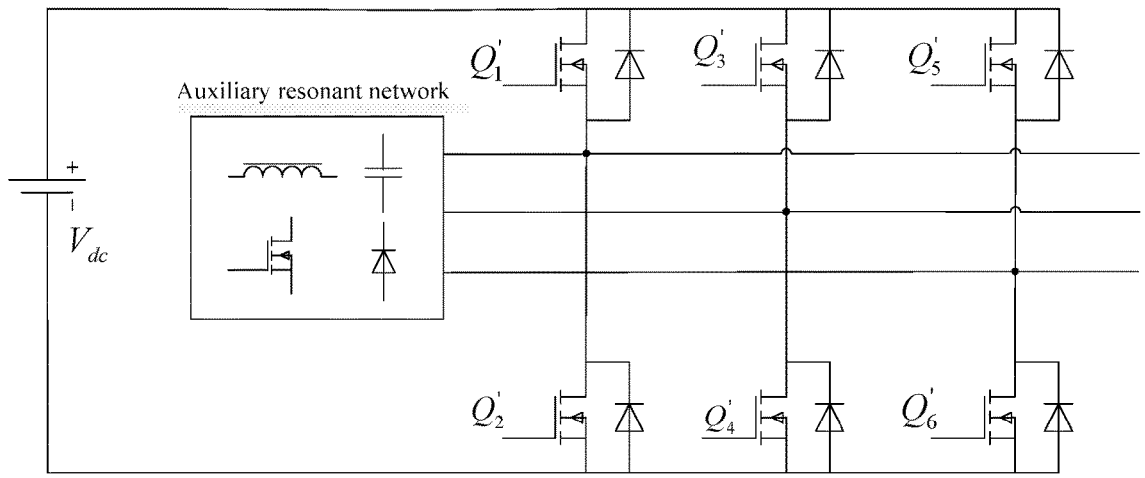
FIG. 3 is a diagram of a third three-phase inverter circuit according to the conventional technology.

According to the conventional technology, as shown in FIG. 1, for each of bridge arms of the three-phase inverter, a first terminal of a filter capacitor at an output end of the bridge arm is connected to an output inductor corresponding to the bridge arm, and second terminals of all filter capacitors are connected to each other. In a case that an output power is low, since a voltage of the bus and an output voltage of the three-phase inverter are fixed, after the inductance of the inductor is determined, the high-frequency switching harmonic current on the inductor is fixed regardless of the output power. With the increase of the output power, a proportion of the high-frequency switching harmonic current in the total current gradually decreases. It can be understood that in a case that the output power is low, the proportion of the high-frequency switching harmonic current in the total current is large, and it is required to increase the inductance of the output inductor to reduce the high-frequency switching harmonic current, to ensure that a total harmonic distortion (THD) of grid-connected current meets the requirements of national standards. The increase of the inductance may bring other problem, for example, the multi-machine parallel system is prone to resonance.

As shown in FIG. 4, in the embodiment of the present disclosure, for each of the bridge arms, a first terminal of a filter capacitor corresponding to the bridge arm is connected to an output inductor of the bridge arm, and a second terminal of the filter capacitor is directly connected to the negative pole of the input direct-current bus (grounding). It can be seen that in the embodiment of the present disclosure, a filtering way at the output end of the three-phase inverter is changed, a suitable filter and a filtering circuit are provided, and an output filter is mainly implemented by the filter capacitor. According to the conventional technology, the output filter of the three-phase inverter is implemented by the output inductor and the filter capacitor. Compared with the conventional three-phase inverter, the three-phase inverter according to the embodiment of the present disclosure is not limited to the output inductor, and is not required to increase the inductance. The filter capacitor provides a new filter circuit for the high-frequency switching harmonic current, whether a power transistor at a lower bridge arm is switched off or on, the high-frequency switching harmonic current may fully flow from the filter capacitor to the input direct-current bus through the filter circuit. That is, the filter circuit may effectively filter out the high-frequency switching harmonic current, to output the grid-connected current without the pollution of the high-frequency switching harmonic current, and even when the output power is low, high-quality grid-connected current can be outputted. In addition, compared with the three-phase inverter according to the conventional technology, the three-phase inverter according to the embodiment of the present disclosure does not require a large filter capacitor.

Due to the limitation of the topology, a switching frequency of the conventional three-phase inverter is generally below 20 kHz. According to the embodiment of the present disclosure, the high-frequency switching harmonic current is filtered out through the filter capacitor, so that a switching frequency of the three-phase inverter according to the embodiment of the present disclosure may be above 200 kHz, and the quality of the waveform of the grid-connected current can be ensured.

The three-phase inverters according to the embodiments are described in detail above. Based on this, a method for controlling a three-phase inverter corresponding to the three-phase inverter is further provided according to the present disclosure.

Figure 5:
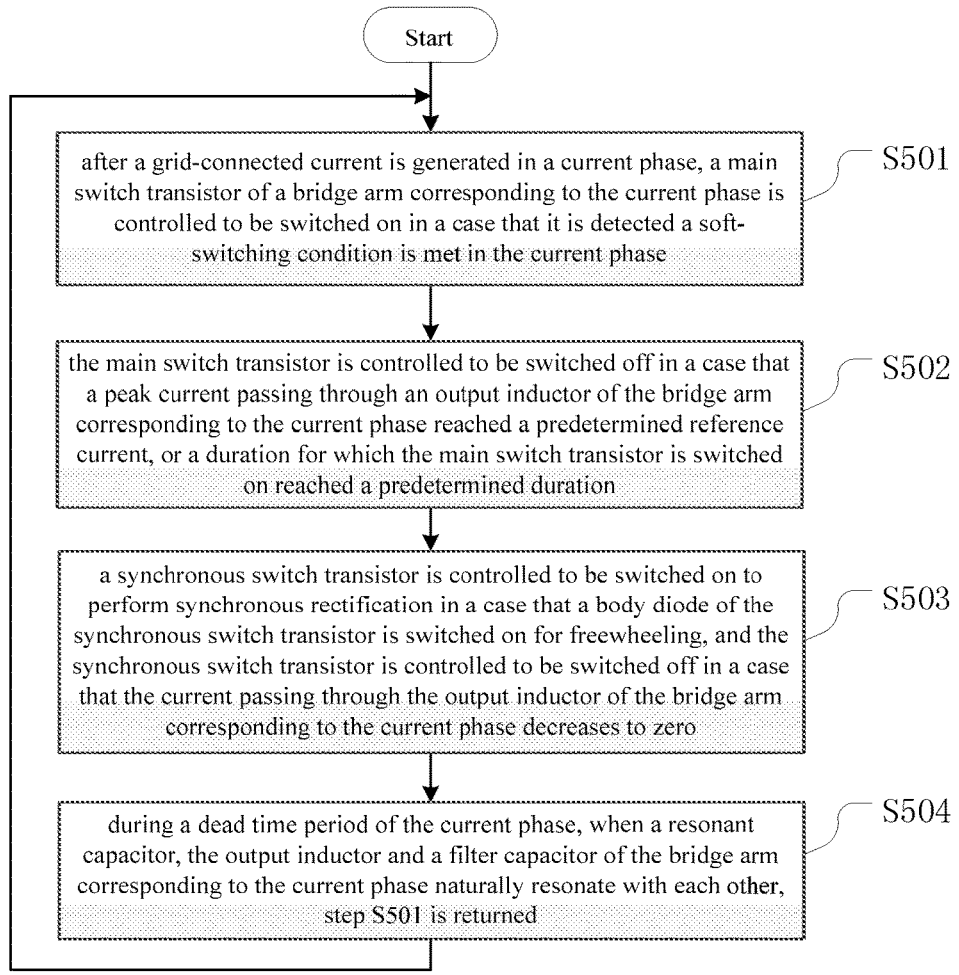
FIG. 5 is a flow chart of a method for controlling a three-phase inverter according to an embodiment of the present disclosure.
Figure 6:
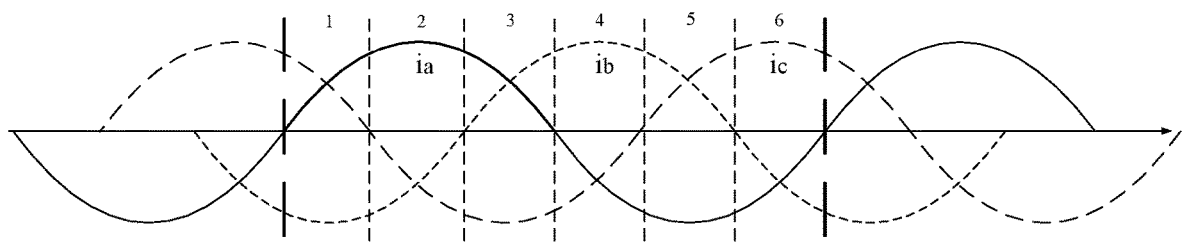
FIG. 6 is a schematic diagram showing six operation phases of a three-phase inverter according to an embodiment of the present disclosure.
Figure 7:
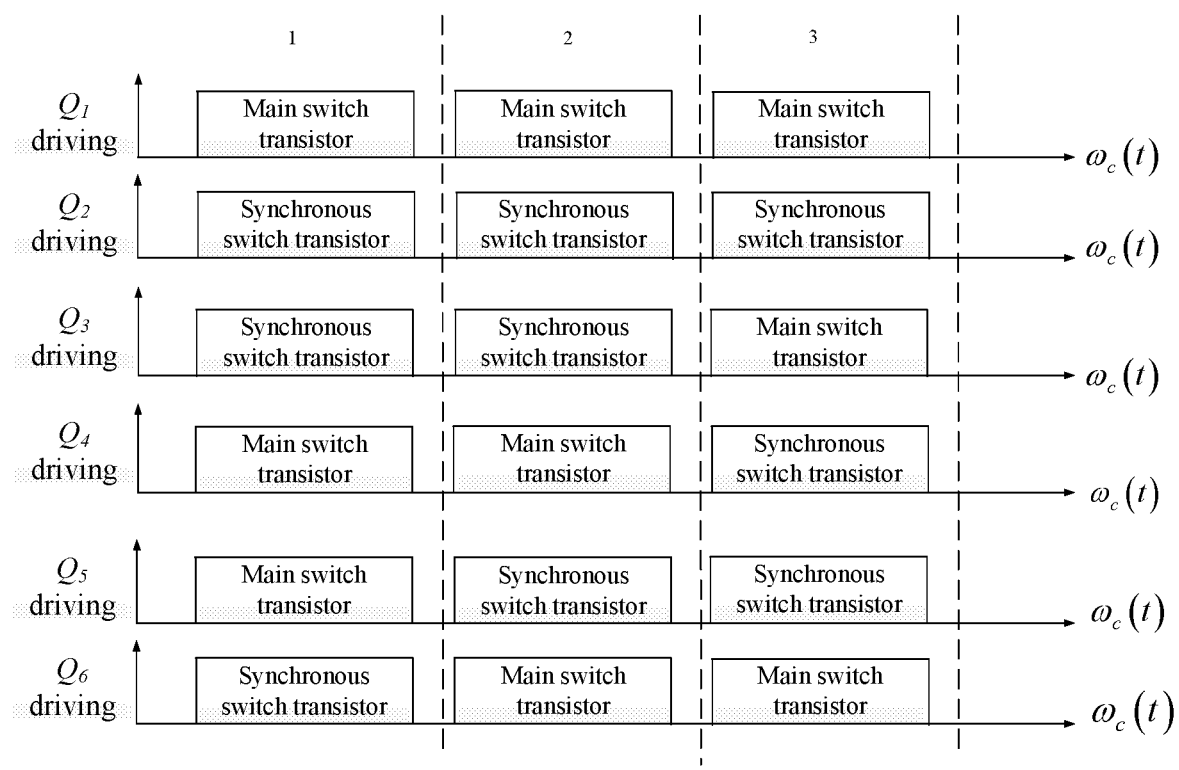
FIG. 7 is a schematic diagram showing a first operation phase to a third operation phase of a three-phase inverter according to an embodiment of the present disclosure.
Figure 8:
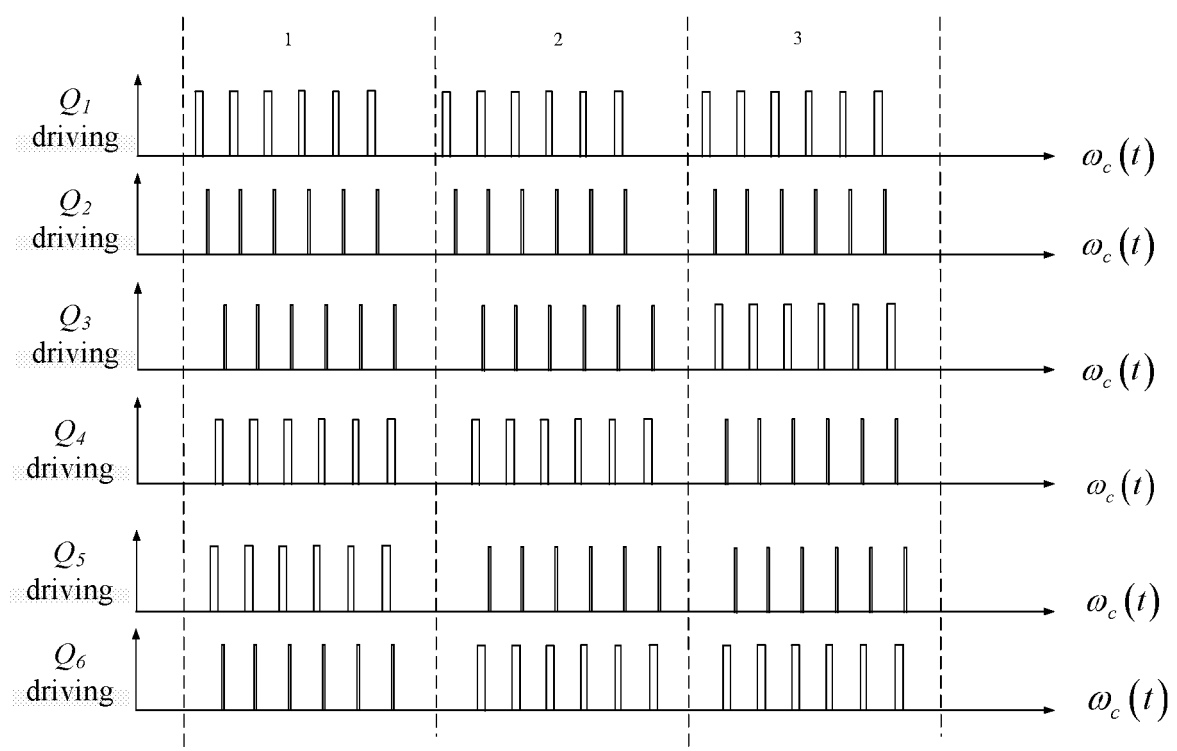
FIG. 8 is a schematic diagram showing a waveform of a driving signal of each bridge arm in a first operation phase to a third operation phase according to an embodiment of the present disclosure.
Figure 9:
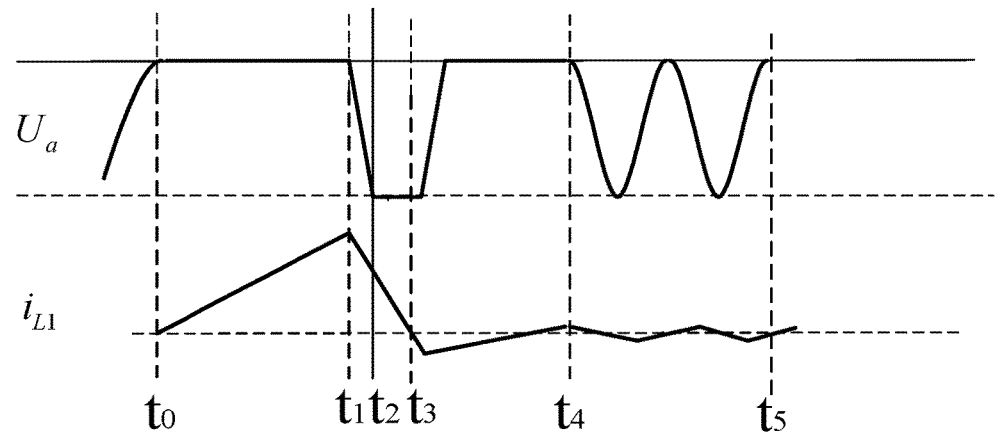
FIG. 9 is a diagram showing waveforms of a midpoint voltage and a current passing through an output inductor corresponding to an a-phase bridge arm according to an embodiment of the present disclosure.
Figure 10A:
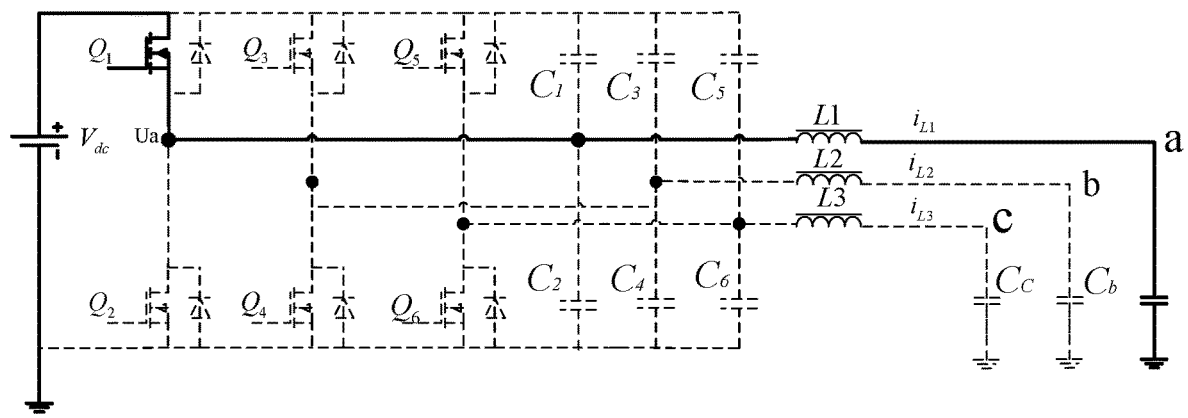
FIG. 10a is a schematic diagram of an a-phase bridge arm in a first control state according to an embodiment of the present disclosure.
Figure 10B:
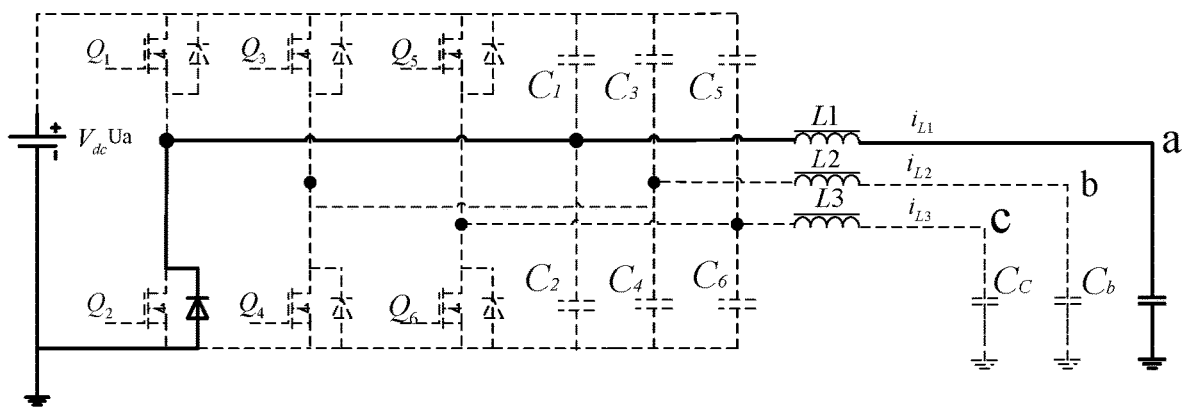
FIG. 10b is a schematic diagram of an a-phase bridge arm in a second control state according to an embodiment of the present disclosure.
Figure 10C:
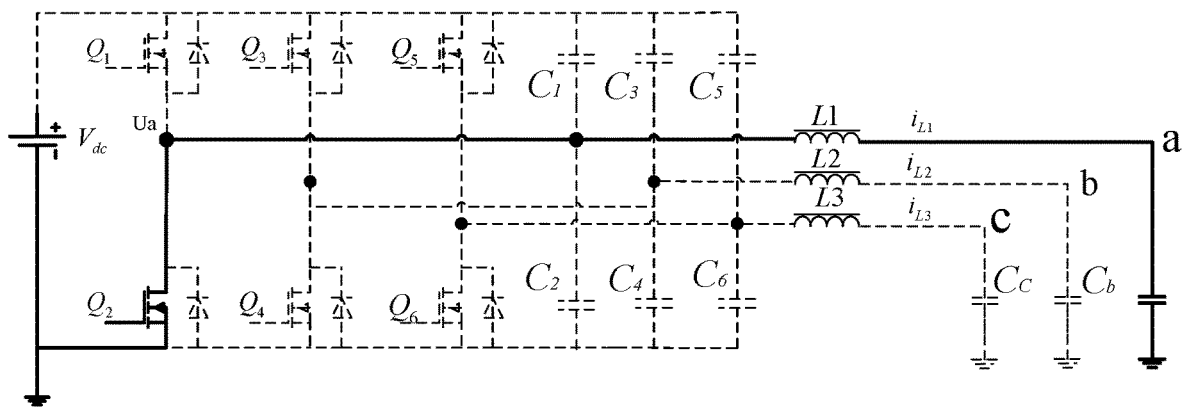
FIG. 10c is a schematic diagram of an a-phase bridge arm in a third control state according to an embodiment of the present disclosure.
Figure 10D:
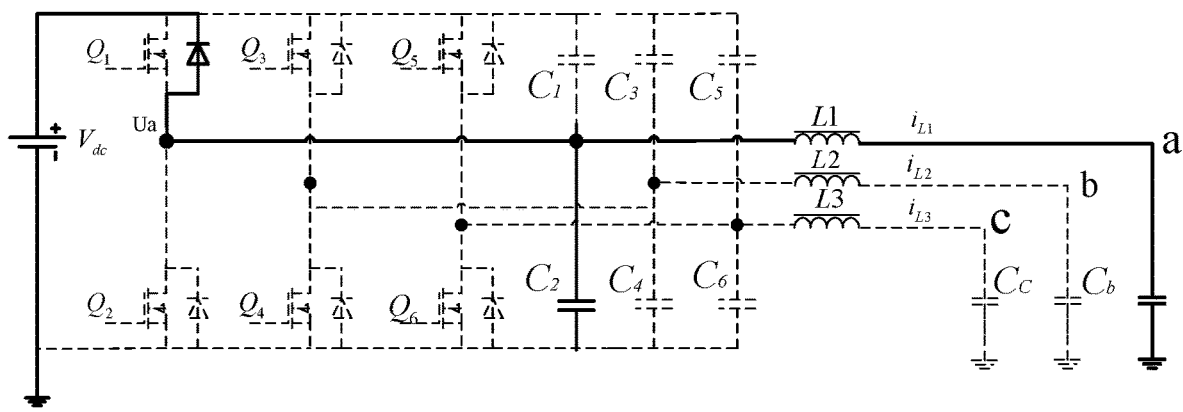
FIG. 10d is a schematic diagram of an a-phase bridge arm in a fourth control state according to an embodiment of the present disclosure.
Figure 10E:
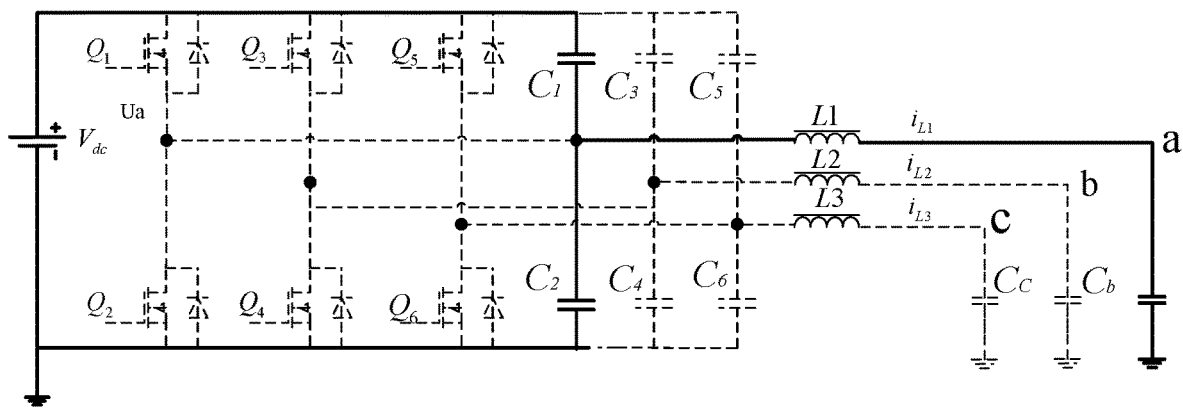
FIG. 10e is a schematic diagram of an a-phase bridge arm in a fifth control state according to an embodiment of the present disclosure.

FIG. 5 is a flow chart of a method for controlling a three-phase inverter according to an embodiment of the present disclosure. FIG. 6 is a schematic diagram showing six operation phases of a three-phase inverter according to an embodiment of the present disclosure. FIG. 7 is a schematic diagram showing a first operation phase to a third operation phase of a three-phase inverter according to an embodiment of the present disclosure. FIG. 8 is a schematic diagram showing a waveform of a driving signal of each bridge arm in a first operation phase to a third operation phase according to an embodiment of the present disclosure. FIG. 9 is a diagram showing waveforms of a midpoint voltage and a current passing through an output inductor corresponding to an a-phase bridge arm according to an embodiment of the present disclosure. FIG. 10a is a schematic diagram of an a-phase bridge arm in a first control state according to an embodiment of the present disclosure. FIG. 10b is a schematic diagram of an a-phase bridge arm in a second control state according to an embodiment of the present disclosure. FIG. 10c is a schematic diagram of an a-phase bridge arm in a third control state according to an embodiment of the present disclosure. FIG. 10d is a schematic diagram of an a-phase bridge arm in a fourth control state according to an embodiment of the present disclosure. FIG. 10e is a schematic diagram of an a-phase bridge arm in a fifth control state according to an embodiment of the present disclosure.

FIGS. 10a to 10e respectively are schematic diagrams of a three-phase inverter that achieves soft-switching in multiple control states according to embodiments of the present disclosure.

As shown in FIG. 5, based on the controller according to any one of the above embodiments, the method for controlling a three-phase inverter according to the embodiment of the present disclosure includes the following steps S501 to S504.

In step S501, after a grid-connected current is generated in a current phase, a main switch transistor of a bridge arm corresponding to the current phase is controlled to be switched on in a case that it is detected a soft-switching condition is met in the current phase.

In step S502, the main switch transistor is controlled to be switched off in a case that a peak current passing through an output inductor of the bridge arm corresponding to the current phase reached a predetermined reference current, or a duration for which the main switch transistor is switched on reached a predetermined duration.

In step S503, a synchronous switch transistor is controlled to be switched on to perform synchronous rectification in a case that a body diode of the synchronous switch transistor is switched on for flyback, and the synchronous switch transistor is controlled to be switched off in a case that the current passing through the output inductor of the bridge arm corresponding to the current phase decreases to zero.

In step S504, during a dead time period of the current phase, when a resonant capacitor, the output inductor and a filter capacitor of the bridge arm corresponding to the current phase naturally resonate with each other, step S501 is returned.

The main switch transistor is a switch transistor that is firstly switched on of the bridge arm corresponding to the current phase, and the synchronous switch transistor is the other switch transistor of the bridge arm corresponding to the current phase.

In an embodiment, a three-phase output of the three-phase inverter in the discontinuous mode is provided according to the embodiment of the present disclosure. In the embodiment of the present disclosure, zero-crossing points of three phase output currents serve as conversion points of an operation phase whether an output power is an active power or a reactive power. According to the zero-crossing points of the three phase output currents, the three-phase inverter according to the embodiment of the present disclosure may operate in six phases. As shown in FIG. 6, for example, zero-crossing points of a-phase current ia respectively serve as a starting point and an ending point, a positive half cycle of the a-phase current ia includes a first operation phase, a second operation phase and a third operation phase, and a negative half cycle of the a-phase current ia includes a fourth operation phase, a fifth operation phase and a sixth operation phase.

In the embodiment of the present disclosure, synchronous rectification is realized. During each operation phase, two switch transistors in each phase bridge arm operate, and are respectively defined as the main switch transistor and the synchronous switch transistor. The main switch transistor is configured to control a waveform of the current passing through a corresponding output inductor, and the synchronous switch transistor is switched on when the main switch transistor is switched off, replacing the flyback of the body diode, to reduce the loss.

Specifically, in step S501, since the output inductor operates in the discontinuous mode, the current passing through the output inductor is zero no matter when the switch transistor is switched on, and the soft-switching condition is that a voltage between a first terminal and a second terminal of the switching transistor is zero. In a case that one of the three phase grid-connected currents is generated, the controller controls the main switch transistor to be switched on when it is detected that a voltage between a first terminal and a second terminal of the main switch transistor is zero through a zero-voltage detection circuit.

In step S502, when the main switch transistor is switched on, the current passing through the corresponding output inductor increases and the current passing through the output inductor of the bridge arm corresponding to the current phase is detected by a current detection circuit. When the peak current passing through the output inductor of the bridge arm corresponding to the current phase reaches the predetermined reference current, the main switch transistor is controlled to be switched off.

In addition, a duration from a time instant when the main switch transistor is switched on to a time instant when the peak current passing through the output inductor of the bridge arm corresponding to the current phase reaches the predetermined reference current is defined as a predetermined duration, and when the duration for which the main switch transistor is switched on reaches the predetermined duration, the main switch transistor is controlled to be switched off.

Considering the symmetry of the positive half cycle and the negative half cycle of the alternating-current power grid and the symmetry of the three-phase alternating-current power grid, an operating mode of each switch transistor in the first operation phase, the second operation phase and the third operation phase is shown in FIG. 7, and the fourth operation phase, the fifth operation phase and the sixth operation phase may be deduced in the same way.

According to the relationship of three-phase alternating-current voltage and current, switch transistors respectively corresponding to the a-phase bridge arm, the b-phase bridge arm and the c-phase bridge arm are controlled to independently operate. In a case that the output current is positive, the switch transistor $Q_1$, the switch transistor $Q_3$ and the switch transistor $Q_5$ are the main switch transistors, and the switch transistor $Q_2$, the switch transistor $Q_4$ and the switch transistor $Q_6$ are the synchronous switch transistors. In a case that the output current is negative, the switch transistor $Q_2$, the switch transistor $Q_4$ and the switch transistor $Q_6$ are the main switch transistors, and the switch transistor $Q_1$, the switch transistor $Q_3$ and the switch transistor $Q_5$ are the synchronous switch transistors. Based on FIG. 6, the operating mode of each switch transistor in the first operation phase, the second operation phase and the third operation phase is shown in FIG. 7, and the fourth operation phase, the fifth operation phase and the sixth operation phase may be deduced in the same way. A waveform of a driving signal of each bridge arm in the first operation phase, the second operation phase and the third operation phase is shown in FIG. 8. Wide high-level signals are on-signals of the main switch transistors, and narrow high-level signals are on-signals of the synchronous switch transistors.

Taking the a-phase bridge arm in the first operation phase as an example, as shown in FIG. 6, the main switch transistor is the switch transistor $Q_1$ and the synchronous switch transistor is the switch transistor $Q_2$, and waveforms of a midpoint voltage $U_a$ and the current $i_L$ passing through the output inductor $L_1$ corresponding to the a-phase bridge arm are shown in FIG. 9.

Based on FIG. 9, the a-phase bridge arm operates mainly in five control states. During an operation interval in FIG. 9 from a time instant $t_0$ to a time instant $t_1$, the a-phase bridge arm operates in a control state as shown in FIG. 10a. At the time instant to, the midpoint voltage $U_a$ of the a-phase bridge arm resonates to a peak, the switch transistor $Q_1$ is switched on, the first terminal of the resonant capacitor $C_1$ is negative and the second terminal of the resonant capacitor $C_1$ is positive, a body diode of the switch transistor $Q_1$ is switched on, and a difference between the voltage $V_{dc}$ of the direct-current bus of the first terminal and the second terminal of the switch transistor $Q_1$ and the midpoint voltage $U_a$ of the a-phase bridge arm is about zero, thus realizing the switching on at zero voltage.

During an operation interval in FIG. 9 from the time instant $t_1$ to a time instant $t_2$, the a-phase bridge arm operates in a control state as shown in FIG. 10b. When a peak current passing through the output inductor $L_1$ reaches the predetermined reference current or a duration for which the switch transistor $Q_1$ is switched on reaches the predetermined duration, the switch transistor $Q_1$ is switched off, and the current passing through the output inductor $L_1$ is freewheeling, so that a body diode of the switch transistor $Q_2$ is switched on.

During an operation interval in FIG. 9 from the time instant $t_2$ to a time instant $t_3$, the a-phase bridge arm operates in a control state as shown in FIG. 10c. When the midpoint voltage $U_a$ of the a-phase bridge arm decreases to the minimum, the controller drives the switch transistor $Q_2$ to be switched on, to realize the synchronous rectification.

During an operation interval in FIG. 9 from the time instant $t_3$ to a time instant $t_4$, the a-phase bridge arm operates in a control state as shown in FIG. 10d. When a flyback current flowing through the switch transistor $Q_2$ decreases to zero, the controller controls a driving signal of the switch transistor $Q_2$ to be at a low level to switch off the switch transistor $Q_2$. The power grid charges the output inductor $L_1$ and the resonant capacitor $C_2$ in reverse, and the current $i_{L1}$ is reversed. When the current $i_{L1}$ reaches a peak reverse current, the output inductor $L_1$ releases energy in reverse, and a voltage of the output inductor $L_1$ is reversed, so that the body diode of the switch transistor $Q_1$ is switched on, the midpoint voltage $U_a$ of the a-phase bridge arm is clamped as the voltage $V_{dc}$ of the direct-current bus, and the energy of the output inductor $L_1$ is fed back to the direct-current bus.

During an operation interval in FIG. 9 from the time instant $t_4$ to a time instant $t_5$, the a-phase bridge arm operates in a control state as shown in FIG. 10e. When the energy of the output inductor $L_1$ is completely released, the output inductor $L_1$, the resonant capacitor $C_2$ and the filter capacitor $C_a$ form a resonant circuit to naturally resonate with each other, and the output inductor $L_1$, the resonant capacitor $C_1$, the direct-current bus and the filter capacitor $C_a$ form another resonant circuit to naturally resonate with each other. The filter capacitor $C_a$ is clamped by the power grid and does not participate in the resonance. During the operation interval from the time instant $t_4$ to the time instant $t_5$, the switch transistor $Q_1$ is switched on in peak to enter a next switching cycle, or the switch transistor $Q_1$ is switched on in trough to enter the fourth operation phase.

It can be understood that the method for controlling the main switch transistors and the synchronous switch transistors corresponding to other operation phases and other operation intervals may refer to FIG. 9, FIG. 10a to FIG. 10e, which are not repeated herein.

Based on the above embodiment, corresponding to a power frequency of the power grid, the controlling the switch transistor of the bridge arm corresponding to the current phase to be switched on or off includes: controlling a waveform of a fundamental component of the output inductor of the bridge arm corresponding to the current phase to be a power frequency sine wave, so that a waveform of output current of the current-phase is a sine wave.

In an embodiment, a waveform of an average equivalent current during each switching cycle is controlled to be a sine wave, so that the waveform of the output current of the current-phase us the sine wave. The switching cycle is a cycle of a grid-connected current generated by the current-phase.

Alternatively, frequency conversion control is performed on the switch transistor, so that the waveform of output current of the current-phase is the sine wave.

Figure 11:
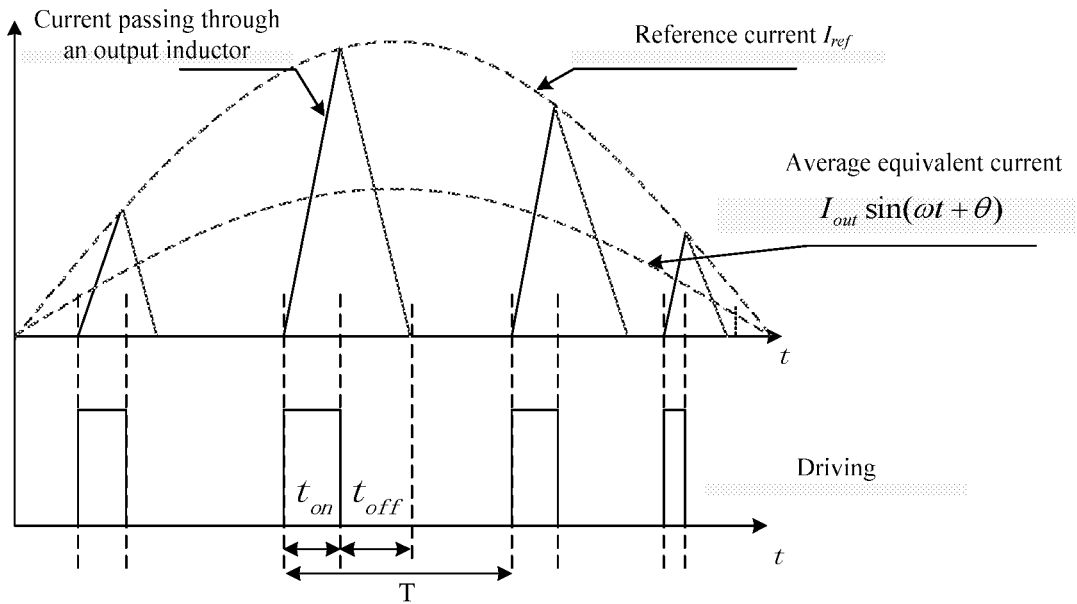
FIG. 11 is a schematic diagram showing the control effect of a switch transistor according to an embodiment of the present disclosure.
Figure 12:
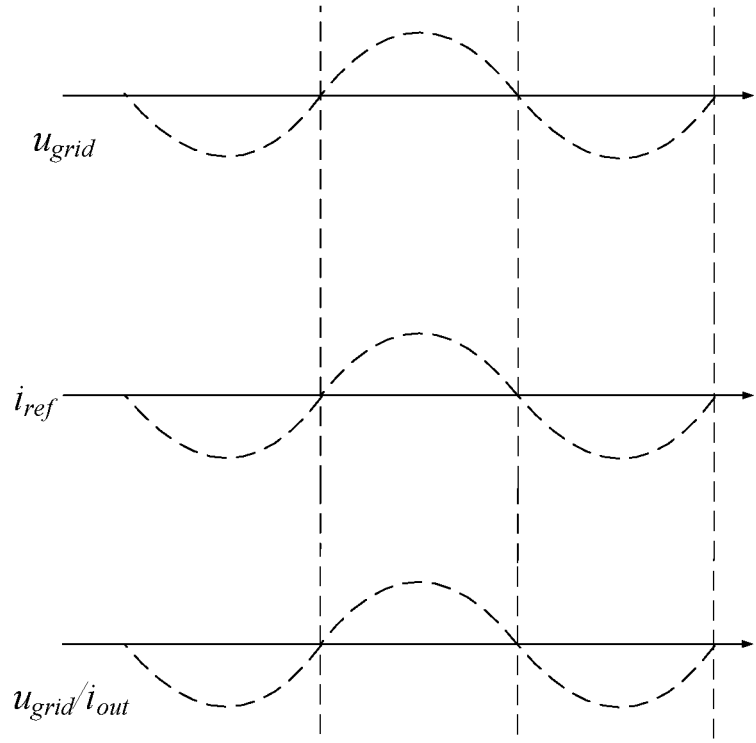
FIG. 12 is a schematic diagram showing a waveform when a full active power output control is performed according to an embodiment of the present disclosure.
Figure 13:
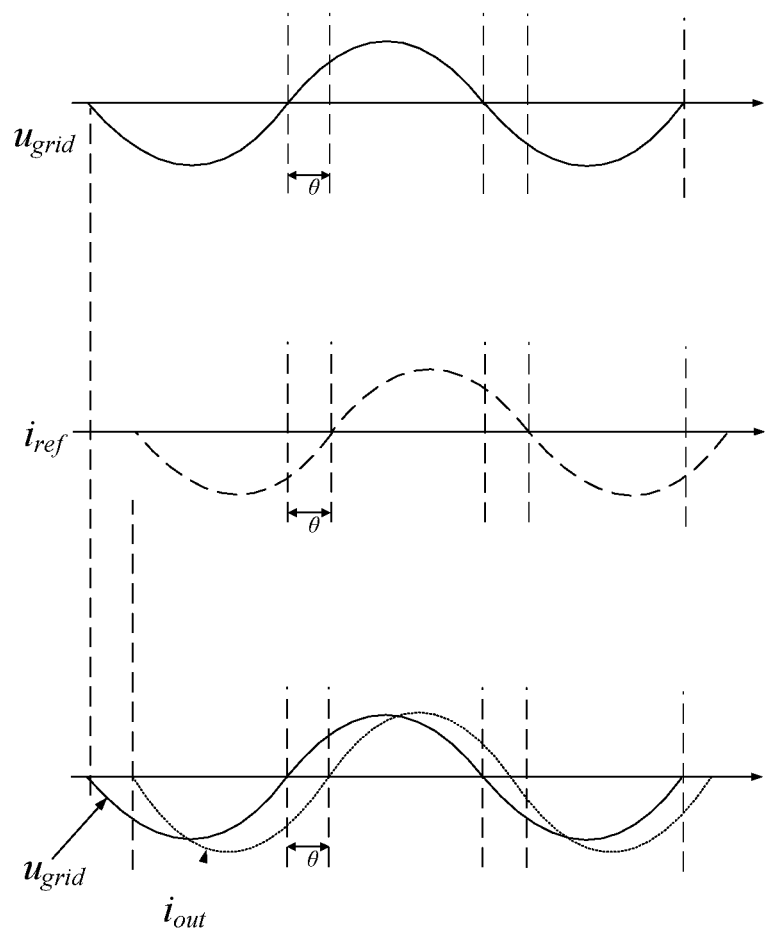
FIG. 13 is a schematic diagram showing a waveform when an incomplete active power output control is performed according to an embodiment of the present disclosure.

FIG. 11 is a schematic diagram showing the control effect of a switch transistor according to an embodiment of the present disclosure. FIG. 12 is a schematic diagram showing a waveform when a full active power output control is performed according to an embodiment of the present disclosure. FIG. 13 is a schematic diagram showing a waveform when an incomplete active power output control is performed according to an embodiment of the present disclosure.

In the above embodiment, the current passing through the output inductor is controlled by the main switch transistor, and a switch node of the main switch transistor refers to the predetermined reference current.

The main switch transistor is controlled based on the predetermined reference current according to an embodiment of the present disclosure. As shown in FIG. 11, in a case that the main switch transistor is controlled based on the predetermined reference current, the current $i_L$ passing through the output inductor increases when the main switch transistor is switched on. The current $i_L$ passing through the output inductor of the bridge arm corresponding to the current phase is detected by a current detection circuit. When the peak current $i_L$ passing through the output inductor is equal to the predetermined reference current $I_{ref}$, the main switch transistor is controlled to be switched off, and the duration for which the main switch transistor is switched on is defined as $t_{on}$.

When the main switch transistor is switched off, the current $i_L$ passing through the output inductor is freewheeling and decreases, and the current $i_L$ decreases to zero when the main switch transistor is switched off for a duration tog, and then switch transistor is switched on after a dead time period. A sum of and the dead time period, the duration $t_{on}$ and the duration $t_{off}$ is a switching cycle T, and a switching frequency is equal to 1/T.

If the main switch transistor is controlled by a predetermined duration, a reference of the duration $t_{on}$, is calculated in advance, a timer starts for timing at a time instant when the main switch transistor is switched on, and then it is determined that the peak current $i_L$ passing through the output inductor is equal to the predetermined reference current $I_{ref}$ when the duration $t_{on}$ expires.

In the above embodiment, the output current of the current-phase is the sine wave by performing frequency conversion control on the switch transistor, that is, the switching cycle T changes at different phases, so that the output current of the current phase is the sine wave. In addition, the number of peaks or troughs may be determined after the main switch transistor is switched off to enter the next switching cycle, that is, the switching frequency is controlled by controlling the dead time period.

It should be noted that during a half cycle of the predetermined reference current, the switch transistor may be controlled to be switched on and off thousands of times. FIG. 11 is a simplified diagram.

In the method for controlling a three-phase inverter according to the embodiment of the present disclosure, the predetermined reference current meets the following equation:

$$\frac{I_{ref}(T_{on} + T_{off})}{2T} = I_{out} \sin(\omega t + \theta),$$

where, $I_{ref}$ represents the predetermined reference current, $T_{on}$ represents the duration for which the main switch transistor is switched on, $T_{off}$ represents a duration for which the synchronous switch transistor is switched on, T represents the switching cycle, $I_{out} \sin(\omega t+\theta)$ represents an average equivalent current passing through the output inductor of the bridge arm corresponding to the current phase during the switching cycle, $\omega$ represents the power frequency of the power grid, and $\theta$ represents a phase difference between the predetermined reference current and a voltage of the power grid.

It should be noted that, in order to meet the conditions for switching on the switch transistor at zero voltage, $$\frac{T_{on} + T_{off}}{2T}$$

is not a fixed value. In order to ensure the quality of the output current, the output current of the current phase is the sine wave by controlling the average equivalent current to be a sine wave during each switching cycle. However, the waveform of the predetermined reference current is not a sine wave, that is, the average equivalent current passing through the output inductor does not change with the preset reference current.

Based on this, the controlling the switch transistor of the bridge arm corresponding to the current phase to be switched on or off includes: adjusting a power factor by controlling the phase difference.

In an embodiment, in a case that the full active power output control is performed, the phase difference is controlled to be zero. In a case that the incomplete active power output control is performed, the phase difference is controlled to not be zero, and a reactive power is adjusted by controlling the phase difference.

In a case that the output power from the three-phase inverter is the full active power, a phase of the output current is identical to a phase of the power grid. According to the embodiment of the present disclosure, as shown in FIG. 12, in a case that a phase of the predetermined reference current $I_{ref}$ is identical to a phase of a voltage $U_{grid}$ of the power grid, the phase difference is zero, that is, $\Delta\theta=0$, and thus zero-crossing points of the predetermined reference current and the power grid are identical to each other, and positive half cycles and negative half cycles of the predetermined reference current and the power grid are respectively identical to each other. Based on the method described above, a phase of the output current $i_L$ is identical to the phase of the predetermined reference current $I_{ref}$, that is, the phase of the output current $i_L$ is identical to the phase of the voltage $U_{grid}$ of the power grid, that is, $\Delta\theta=0$, so that the full active power output is realized.

In a case that the reactive power is outputted or the power factor is required to be adjusted, the phase of the predetermined reference current $I_{ref}$ is different from the phase of the voltage $U_{grid}$ of the power grid. According to the embodiment of the present disclosure, as shown in FIG. 13, the phase of the predetermined reference current $I_{ref}$ is different from the phase of the voltage $U_{grid}$ of the power grid, that is, $\Delta\theta\neq0$, and thus zero-crossing points of the predetermined reference current and the power grid are different. Based on the method described above, the phase of the output current $i_L$ is identical to the phase of the predetermined reference current $I_{ref}$, that is, the phase of the output current $i_L$ is different from the phase of the voltage $U_{grid}$ of the power grid, that is, $\Delta\theta\neq0$, so that the reactive power is outputted. The reactive power may be adjusted by controlling the phase difference $\theta$ between the predetermined reference current $I_{ref}$ and the voltage $U_{grid}$ of the power grid.

The three-phase inverter and the method for controlling the three-phase inverter according to the present disclosure are described in detail above. The embodiments in this specification are described in a progressive way, each of which emphasizes the differences from others, and the same or similar parts among the embodiments can be referred to each other. It should be noted that improvements and modifications may also be made by those skilled in the art without departing from the principle of the present disclosure. Those improvements and modifications should also be included in the protection scope of the present disclosure.

It should be further noted that the relationship terminologies in the present disclosure such as "first" and "second" are only used herein to distinguish one entity or operation from another entity or operation, rather than to necessitate or imply that the actual relationship or order exists between the entities or operations. Moreover, terms of "include", "comprise" or any other variants are intended to be non-exclusive. Therefore, a process, method, article or device including multiple elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

The invention claimed is:

1. A three-phase inverter, comprising: three bridge arms, resonant capacitors, output inductors, filter capacitors, and a controller, wherein for each of the three bridge arms,
said bridge arm is provided with two switch transistors, the controller is connected to a control terminal of each of the two switch transistors; a first terminal of a switch transistor of the two switch transistors of said bridge arm is connected to a positive pole of a direct-current bus, a second terminal of the other switch transistor of the two switch transistors of said bridge arm is connected to a negative pole of the direct-current bus, a second terminal of the switch transistor of the two switch transistors of said bridge arm is connected to a first terminal of the other switch transistor of the two switch transistors of said bridge arm, and a connection point of the two switch transistors serves as a midpoint of said bridge arm; and said bridge arm corresponds to two resonant capacitors, one output inductor and one filter capacitor, a first terminal of a resonant capacitor of the two resonant capacitors is connected to the positive pole of the direct-current bus, a second terminal of the other resonant capacitor of the two resonant capacitors is connected to the negative pole of the direct-current bus, a second terminal of the resonant capacitor of the two resonant capacitors is connected to a first terminal of the other resonant capacitor of the two resonant capacitors, the midpoint of said bridge arm and a first terminal of the output inductor, and a second terminal of the output inductor is connected to a first terminal of the filter capacitor; and wherein second terminals of all the filter capacitors are connected to each other and are connected to the negative pole of the direct-current bus, wherein the controller is configured for:

after a grid-connected current is generated in a current phase, controlling a main switch transistor of a bridge arm corresponding to the current phase to be switched on in a case that it is detected a soft-switching condition is met in the current phase;

controlling the main switch transistor to be switched off, in a case that a peak current passing through an output inductor of the bridge arm corresponding to the current phase reached a predetermined reference current, or a duration for which the main switch transistor is switched on reached a predetermined duration;

controlling a synchronous switch transistor to be switched on to perform synchronous rectification in a case that a body diode of the synchronous switch transistor is switched on, and controlling the synchronous switch transistor to be switched off in a case that a current passing through the output inductor of the bridge arm corresponding to the current phase decreases to zero;

during a dead time period of the current phase, when a resonant capacitor, the output inductor and a filter capacitor of the bridge arm corresponding to the current phase naturally resonate with each other, returning to a step of the controlling the main switch transistor of the bridge arm corresponding to the current phase to be switched on in a case that it is detected the soft-switching condition is met;

wherein the main switch transistor is a switch transistor that is firstly switched on of the bridge arm corresponding to the current phase, and the synchronous switch transistor is the other switch transistor of the bridge arm corresponding to the current phase, wherein the predetermined reference current meets the following equation:

$$\frac{I_{ref}(T_{on}+T_{off})}{2T} = I_{out}\sin(\omega t + \theta),$$

where, $I_{ref}$ represents the predetermined reference current, $T_{on}$ represents the duration for which the main switch transistor is switched on, $T_{off}$ represents a duration for which the synchronous switch transistor is switched on, T represents a switching cycle, $I_{out}\sin(\omega t+\theta)$ represents an average equivalent current passing through the output inductor of the bridge arm corresponding to the current phase during the switching cycle, $\omega$ represents a power frequency of a power grid, and $\theta$ represents a phase difference between the predetermined reference current and a voltage of the power grid.

2. The three-phase inverter according to claim 1, wherein the second terminals of all the filter capacitors are grounded.

3. The three-phase inverter according to claim 1, wherein the controller is a digital signal processor or a field programmable gate array.

4. A method for controlling a three-phase inverter, applied to a three-phase inverter, the three-phase inverter comprises: three bridge arms, resonant capacitors, output inductors, filter capacitors, and a controller, wherein for each of the three bridge arms, said bridge arm is provided with two switch transistors, the controller is connected to a control terminal of each of the two switch transistors; a first terminal of a switch transistor of the two switch transistors of said bridge arm is connected to a positive pole of a direct-current bus, a second terminal of the other switch transistor of the two switch transistors of said bridge arm is connected to a negative pole of the direct-current bus, a second terminal of the switch transistor of the two switch transistors of said bridge arm is connected to a first terminal of the other switch transistor of the two switch transistors of said bridge arm, and a connection point of the two switch transistors serves as a midpoint of said bridge arm; and said bridge arm corresponds to two resonant capacitors, one output inductor and one filter capacitor, a first terminal of a resonant capacitor of the two resonant capacitors is connected to the positive pole of the direct-current bus, a second terminal of the other resonant capacitor of the two resonant capacitors is connected to the negative pole of the direct-current bus, a second terminal of the resonant capacitor of the two resonant capacitors is connected to a first terminal of the other resonant capacitor of the two resonant capacitors, the midpoint of said bridge arm and a first terminal of the output inductor, and a second terminal of the output inductor is connected to a first terminal of the filter capacitor; and wherein second terminals of all the filter capacitors are connected to each other and are connected to the negative pole of the direct-current bus;

wherein the method comprises:

after a grid-connected current is generated in a current phase, controlling a main switch transistor of a bridge arm corresponding to the current phase to be switched on in a case that it is detected a soft-switching condition is met in the current phase;

controlling the main switch transistor to be switched off, in a case that a peak current passing through an output inductor of the bridge arm corresponding to the current phase reached a predetermined reference current, or a duration for which the main switch transistor is switched on reached a predetermined duration;

controlling a synchronous switch transistor to be switched on to perform synchronous rectification in a case that a body diode of the synchronous switch transistor is switched on, and controlling the synchronous switch transistor to be switched off in a case that a current passing through the output inductor of the bridge arm corresponding to the current phase decreases to zero;

during a dead time period of the current phase, when a resonant capacitor, the output inductor and a filter capacitor of the bridge arm corresponding to the current phase naturally resonate with each other, returning to a step of the controlling the main switch transistor of the bridge arm corresponding to the current phase to be switched on in a case that it is detected the soft-switching condition is met;

wherein the main switch transistor is a switch transistor that is firstly switched on of the bridge arm corresponding to the current phase, and the synchronous switch transistor is the other switch transistor of the bridge arm corresponding to the current phase, wherein the predetermined reference current meets the following equation:

$$\frac{I_{ref}(T_{on} + T_{off})}{2T} = I_{out} \sin(\omega t + \theta),$$

where, $I_{ref}$ represents the predetermined reference current, $T_{on}$ represents the duration for which the main switch transistor is switched on, $T_{off}$ represents a duration for which the synchronous switch transistor is switched on, T represents a switching cycle, $I_{out}\sin(\omega t+\theta)$ represents an average equivalent current passing through the output inductor of the bridge arm corresponding to the current phase during the switching cycle, ω represents a power frequency of a power grid, and θ represents a phase difference between the predetermined reference current and a voltage of the power grid.

5. The method according to claim 4, wherein controlling the switch transistor of the bridge arm corresponding to the current phase to be switched on or off comprises:

controlling a waveform of a fundamental component of the output inductor of the bridge arm corresponding to the current phase to be a power frequency sine wave, so that a waveform of an output current of the current phase is a sine wave.

6. The method according to claim 5, wherein the controlling a waveform of a fundamental component of the output inductor of the bridge arm corresponding to the current phase to be a power frequency sine wave, so that a waveform of an output current of the current phase is a sine wave comprises:

controlling a waveform of an average equivalent current during each switching cycle to be a sine wave, so that the waveform of the output current of the current phase is the sine wave;

wherein the switching cycle is a cycle of a grid-connected current generated by the current phase.

7. The method according to claim 5, wherein the controlling a waveform of a fundamental component of the output inductor of the bridge arm corresponding to the current phase to be a power frequency sine wave, so that a waveform of an output current of the current phase is a sine wave comprises:

performing frequency conversion control on the switch transistor, so that the waveform of output current of the current phase is the sine wave.

8. The method according to claim 4, wherein controlling the switch transistor of the bridge arm corresponding to the current phase to be switched on or off comprises:

adjusting a power factor by controlling the phase difference.

9. The method according to claim 8, wherein the adjusting a power factor by controlling the phase difference comprises:

when a full active power output control is performed, controlling the phase difference to be zero; and when an incomplete active power output control is performed, controlling the phase difference to be non-zero, and adjusting a reactive power by controlling the phase difference.

* * * * *